United States Patent [19]

Maxey

[11] 3,867,334

[45] Feb. 18, 1975

[54] ANTIHARDENERS FOR POLYMERS

[75] Inventor: Frank S. Maxey, Uniontown, Ohio

[73] Assignee: The Goodyear Tire & Rubber Company, Akron, Ohio

[22] Filed: Jan. 30, 1974

[21] Appl. No.: 438,055

[52] U.S. Cl......... 260/42.32, 260/42.37, 260/42.47, 260/42.48, 260/42.52, 260/45.9 NC, 260/83.3, 260/85.1, 260/562 P, 260/801
[51] Int. Cl... C08c 11/10, C08c 11/18, C08c 11/46
[58] Field of Search......... 260/45.9 NC, 801, 562 P, 260/42.32, 42.47, 42.48, 83.3, 85.1

[56] References Cited
UNITED STATES PATENTS 3,576,003   4/1971   Strobel et al................ 260/45.9 NC
3,658,769   4/1972   Kline............................. 260/83.7

*Primary Examiner*—Melvyn I. Marquis
*Assistant Examiner*—H. H. Fletcher
*Attorney, Agent, or Firm*—F. W. Brunner; J. A. Rozmajzl

[57] ABSTRACT

Amide age resisters such as N-(4-anilinophenyl) acrylamide and methacrylamide are added to certain diene polymers such as SBR, NBR and natural rubber prior to compounding with reinforcing agents such as carbon black, thereby improving the hardening resistance of the subsequently sulfur vulcanized polymer.

10 Claims, No Drawings

ANTIHARDENERS FOR POLYMERS

This invention relates to reinforced diene vulcanizates which are resistant to hardening. More particularly, this invention relates to a process of improving the resistance of certain loaded diene rubber vulcanizates to hardening.

Various diene rubber vulcanizates have been known to harden while being stored or used at elevated temperatures. The hardening can be due to changes in the crosslink structure of the polymer, resinification or cyclization of the polymer or bridging of the polymer chains. Hardening can cause tire treads to crack or chunk, hoses to split, gaskets to fail to seal properly and belt covers to crack. It will manifest itself as an increase in hardness, an increase in modulus, a decrease in elongation and sometimes as a decrease in tensile.

It is an object of the present invention to provide a process for improving the resistance of certain reinforced diene rubber vulcanizates to hardening. It is also an object of the present invention to provide unvulcanized reinforced rubber compositions which can be vulcanized into reinforced rubber vulcanizates which are resistant to hardening. Other objects will become apparent as the description proceeds.

The objects of the present invention are accomplished by adding an amide to the vulcanized diene rubber prior to the addition of a substantial amount of the reinforcing agent.

The amide has the following structural formula:

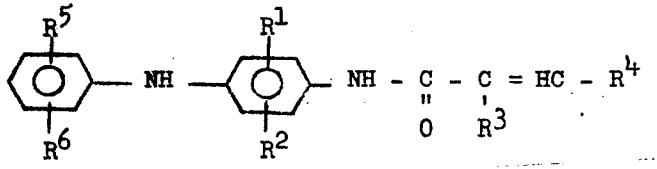

wherein $R^1$, $R^2$, $R^5$ and $R^6$ are selected from the group consisting of hydrogen and alkyl radicals having from 1 to 4 carbon atoms, wherein $R^5$ and $R^6$ can also be alkoxy radicals having 1 to 4 carbon atoms, and wherein $R^3$ is selected from the group consisting of hydrogen, alkyl radicals having from 1 to 4 carbon atoms, aryl radicals having from 6 to 12 carbon atoms, aralkyl radicals having from 7 to 13 carbon atoms, cycloalkyl radicals having from 5 to 12 carbon atoms atoms, carboxymethyl radicals and carbalkoxy methyl radicals and wherein $R^4$ is selected from the group consisting of hydrogen, alkyl radicals having from 1 to 4 carbon atoms, aryl radicals having from 6 to 12 carbon atoms, cycloalkyl radicals having from 5 to 12 carbon atoms, carboxy radicals and carbalkoxy radicals.

The carbalkoxy methyl radicals preferably have the following structural formula

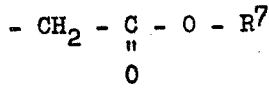

wherein $R^7$ is an alkyl radical having from 1 to 4 carbon atoms. Preferably the carbalkoxy radicals have the following structural formula

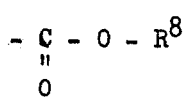

wherein $R^8$ is an alkyl radical having from 1 to 4 carbon atoms.

Preferably $R^1$, $R^2$, $R^5$ and $R^6$ are selected from the group consisting of hydrogen and methyl. Preferably $R^3$ is selected from the group consisting of hydrogen and methyl. Preferably $R^4$ is hydrogen. Preferably $R^7$ and $R^8$ are selected from the group consisting of methyl and ethyl.

Representative amides which can be used in the practice of the present invention include the following.

N-(4-anilinophenyl) acrylamide
N-(4-anilinophenyl) methacrylamide
N-(4-anilinophenyl) cinnamamide
N-(4-anilinophenyl) crotonamide
N-[4-(4-methylanilino)phenyl] acrylamide
N-[4-(4-methylanilino)phenyl] methacrylamide
N-[4-(4-methoxyanilino)phenyl] acrylamide
N-[4-(4-methoxyanilino)phenyl] methacrylamide
N-[4-(4-ethoxyanilino)phenyl] acrylamide
N-[4-(4-ethoxyanilino)phenyl] methacrylamide
N-[4-(4-N,N-dimethylaminoanilino)phenyl] acrylamide
N-(4-anilinophenyl) maleamic acid
N-(4-anilinophenyl) itaconamic acid
N-[4-(4-methylanilino)phenyl] maleamic acid
N-(-anilinophenyl) citraconamic acid The method of preparing the amides is not critical to the performance of these compounds in the practice of the present invention.

The amides can be prepared by reacting normally in substantially molar amounts an amine of the structure

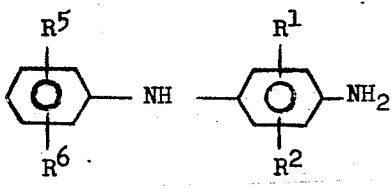

with an acid halide of the structure

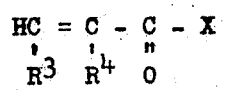

where $R^1$, $R^2$, $R^3$ and $R^4$ are as defined earlier herein and wherein X is selected from the group consisting of chloride and bromide radicals, in the presence of an acid absorbing agent which may be an inorganic salt, e.g., sodium carbonate, or an organic tertiary amine, e.g., triethylamine. The reaction is usually carried out by dropwise addition of a solution of the acid halide in an aprotic solvent to a solution of the amine which contains in solution or in suspension a compound capable of reacting with the hydrogen halide formed during the reaction. A slight excess of acid halide may be used. The reaction is usually exothermic so the temperature during reaction is held to a maximum of 50° C. by means of an ice water bath. The reaction mixture is stirred for an hour or more after the addition of acid halide has been completed. The product usually precipitates during the course of the reaction. It is then filtered off, dried, and purified as necessary.

Examples of amines which can be used in preparing the amides are as follows.

4-aminodiphenylamine
4-amino-4'-methyl diphenylamine
4-amino-4'-methoxy diphenylamine
4-amino-4'-ethoxy diphenylamine
4-amino-4'-(N,N-dimethylamine) diphenylamine
4-amino-4'-isopropyl diphenylamine The level of antioxidant which can be used effectively in the practice of the present invention should generally not be less than 0.25 part per 100 parts by weight of uncompounded diene rubber. Preferably the level is at least 0.5 part. The upper level of amide antioxidant that can be used is 5.0 parts and higher. Preferably, however, the upper level will not exceed 2.0 parts. A preferred range of antioxidant is from 1.0 part to 1.5 parts.

Examples 1, 2, 5 and 6 in U.S. Pat. No. 3,658,769 illustrate the preparation of compounds of the present invention and are incorporated herein by reference.

The amides of the present invention can be used alone or in combination. They are added to the diene rubber prior to the addition of the reinforcing agent.

A reinforcing agent interacts with the rubber to increase the modulus and hardness of the rubber. Typical well known reinforcing agents are the carbon blacks (such as HAF, SAF, ISAF, SRF, FEF and GPE blacks) and silicas such as precipitated fine particle size hydrated amorphous silicas and fumed silicas (non-hydrated). Other non-black reinforcing agents are calcium silicate, aluminum silicate and silica. A discussion of rubber reinforcing agents appears in *Reinforcement of Elastomers* by Gerard Kraus, Interscience Publishers, a Division of John Wiley and Sons, Inc. (New York, London and Sidney), copyrighted 1965.

It has been discovered that time of addition of the amide is critical if antihardening improvements are to be obtained. If the amide is added after the reinforcing agent is added, the vulcanized polymer will have a greater tendency to harden on aging. If the amide is added prior to the addition of the reinforcing agent, the vulcanizate will be more resistant to hardening. The larger the amount of the reinforcing agent added prior to the amide addition, the greater is the tendency of the vulcanizate to harden. The amide therefore must be added before all of the reinforcing agent has been added. Preferably the amide is added before half of the reinforcing agent is added. More preferably the amide is added before a third or even a quarter of the reinforcing agent has been added. That is to say that the amide is added before a substantial amount of reinforcing agent is added. Most preferably the amide is added before any of the reinforcing agent is added. As a guideline, the polymer to which the amide is added should normally contain less than 30 parts by weight of reinforcing agent per 100 parts by weight of polymer when the amide is added, preferably less than 20 parts and most preferably less than 10 parts. The remainder or all of the reinforcing agent is then added.

A 67/33 butadiene/acrylonitrile rubber (NBR) was compounded as indicated in the following table. Examples 1 and 2 were compounded and vulcanized using one type of a vulcanization system while Examples 3 and 4 were compounded and vulcanized using another vulcanization system. In Examples 1 and 3, N-(4-anilinophenyl) methacrylamide was added prior to the addition of carbon black. In Examples 2 and 4 the methacrylamide was added with carbon black in the Banbury. The compounded rubbers were vulcanized at optimum times and temperatures, and then aged for various times at various temperatures. The aged tensiles (meganeutons) and elongations (percent) were measured. The tensile x elongation products are shown in the following table.

TABLE I

|  | Examples | | | |
|---|---|---|---|---|
|  | 1 | 2 | 3 | 4 |
| NBR | 100 | | | |
| N-(4-anilinophenyl) methacrylamide | 1 | | | |
| Carbon black | 60 | | | |
| Stearic acid | 1 | | | |
| Oil | 5 | | | |
| Amine antioxidant | 1 | | | |
| Magnesium oxide | 5 | 5 | — | — |
| Zinc oxide | — | — | 3 | 3 |
| Benzothiazyl disulfide | 1.5 | 1.5 | — | — |
| Cadmium oxide | 2.0 | 2.0 | — | — |
| Cadmium diethyl dithiocarbamate | 2.5 | 2.5 | — | — |
| 2-(morpholinodithio)-benzothiazole | — | — | 1.5 | 1.5 |
| Tetramethyl thiuram disulfide | — | — | 2.0 | 2.0 |
| 2-(morpholinothio)-benzothiazole | — | — | 1.5 | 1.5 |
| Sulfur | 0.3 | 0.3 | — | — |
| Vulcanization (min. at 150°C.) | 10 | 11 | 27 | 30 |
| Tensile × Elongation × 10⁻³ | | | | |
| Original | 4.8 | 4.9 | 10.4 | 11.0 |
| 70 hours at 121°C. | 3.9 | 3.7 | 8.3 | 7.1 |
| 7 days at 121°C. | 2.6 | 2.3 | 5.3 | 4.4 |
| 14 days at 121°C. | .33 | .28 | 3.4 | 1.5 |
| 70 hours at 150°C. | .8 | .8 | 4.5 | 1.2 |
| 70 hours ASTM No. 30:1 at 150°C. | 4.6 | 4.4 | 9.8 | 8.5 |
| 7 days ASTM No. 30:1 at 150°C. | 3.8 | 3.2 | 9.5 | 7.5 |
| 14 days ASTM No. 30:1 at 150°C. | 2.9 | 2.5 | 8.0 | 6.1 |

Examples 1 and 3 represent the practice of the present invention, i.e., the addition of the amide prior to the addition of the reinforcing agent. The aging results with Examples 1 and 3 were superior to those obtained with 2 and 4 respectively. It will be noted that the order of addition was more critical with the vulcanization system used in Examples 3 and 4. This illustrates the fact that the order of addition is more critical with the more efficient vulcanization (EV) systems such as the system of Examples 3 and 4.

It should be noted that the present invention does not benefit low efficiency vulcanization systems. The systems which benefit are the efficient and semi-efficient vulcanization systems which are well known in the art. Such systems are described in the two articles appearing in Rubber Age, the November and December issue of 1967, the articles being entitled "EV Systems For NR-Part 1" and "EV Systems for NR-Part 2," as well as in the Natural Rubber Technical Information Sheets Nos. 118 and 119, published by the Natural Rubber producers Research Association. EV and semi-EV systems are characterized by the fact that they provide a large number of sulfur crosslinks for a given amount of sulfur, whether added as free sulfur or resulting from a sulfur donor, i.e., a compound capable of providing sulfur such as tetramethyl thiuram disulfide or 2-(morpholinodithio)-benzothiazole. Normally a low level of sulfur is used, for example 0.7 part by weight per 100 parts by weight of polymer and even a 0.5 part and below. In fact, sulfurless systems using sulfur donors are particularly efficient systems (note Examples 3 and 4 above). The object of an efficient or semi-efficient system is to provide as many monosulfidic crosslinks as possible and as few cyclic sulfide groups as possible.

In Examples 5, 6, 7, 8 and 9 N-(4-anilinophenyl) methacrylamide was added to an SBR stock before any carbon black was added and after various amounts of carbon black were added. Again the samples were vulcanized and aged. The compounding recipe and test results are shown below.

Silica-type reinforcing agents could have been substituted in the previous examples for the carbon black, and improvements based on order of addition would have been obtained.

Any of the conventional compounding techniques, e.g., banburying and milling, can be used.

The diene polymers which will benefit by the practice of the present invention are those polymers prepared from conjugated diene monomer. The diene polymer can be a homopolymer or a copolymer of diene monomer and one or more comonomers. The copolymer will contain at least 40 parts by weight per 100 parts by weight of polymer of one or more segmeric forms of conjugated diene monomer, preferably at least 50 parts and most preferably at least 60 parts. Illustrative conjugated 1,3-diene monomers are butadiene-1,3; isoprene; 2-chlorobutadiene; 2-ethyl-butadiene-1,3; and 2,3-dimethyl butadiene-1,3. Copolymerizable monomers include vinyl and vinylidene monomers such as styrene, α-methyl styrene, divinyl benzene, vinyl acetate, vinylidene chloride methylmethacrylate, ethylacrylate, the vinyl pyridines including 2-vinyl pyridine; 5-methyl-2-vinyl pyridine; 4-vinyl pyridine and 2-vinyl-5-ethyl pyridine; acrylonitrile, methacrylonitrile, methacrylic acid and acrylic acid. Mixtures of the diene monomers and mixtures of the comonomers can be used.

If the polymer contains a substantial amount of a built-in antihardener, for example the amide-containing polymers described in U.S. Pat. No. 3,658,769, then the benefit of the present invention could be minimal or non-existent. As a guideline, a polymer containing 0.25 part by weight of such a built-in antihardener would probably not benefit from the practice of the present invention. It is to be understood, therefore, that a vulcanizate having a tendency to harden would not include polymers which have no such tendency.

The term sulfur-type vulcanization system is intended to include free-sulfur or sulfur donor systems as well as combinations thereof.

TABLE II

|  | Examples | | | | | |
| --- | --- | --- | --- | --- | --- | --- |
|  | 5 | 6 | 7 | 8 | 9 | 10 |
| SBR 1500 | 100 | | | | | |
| Zinc oxide | 3 | | | | | |
| Magnesium oxide | 4 | | | | | |
| Carbon black | 60 | | | | | |
| Stearic acid | 1 | | | | | |
| Oil | 5 | | | | | |
| N-(4-anilinophenyl)methacrylamide | 1$^{(1)}$ | 1$^{(2)}$ | 1$^{(3)}$ | 1$^{(4)}$ | 1$^{(5)}$ | — |
| Tetramethyl thiuram disulfide | 2.25 | | | | | |
| 2-(morpholinodithio)-benzothiazole | 1.5 | | | | | |
| 2-(morpholinothio)-benzothiazole | 1.0 | | | | | |
| Vulcanization (min. at 150°C.) | 25 | 25 | 25 | 25 | 25 | 25 |
| Tensile × Elongation × $10^{-3}$ | | | | | | |
| Original | 7.9 | 7.9 | 8.1 | 8.2 | 7.5 | 6.0 |
| 70 hours at 150°C. | 2.3 | 1.5 | 1.1 | 1.4 | 1.2 | 1.2 |
| 7 days at 121°C. | 6.1 | 5.8 | 5.3 | 5.2 | 4.7 | 5.1 |
| 14 days at 121°C. | 4.7 | 4.6 | 3.9 | 3.7 | 3.4 | 3.4 |

(1) Added before addition of any carbon black.
(2) after 15 parts of carbon black added.
(3) Added after 30 parts of carbon black added.
(4) Added after 60 parts of carbon black added.
(5) Added on mill with curatives after 60 parts of carbon black added.

Depending upon the type of aging, the addition of the methacrylamide before any of the carbon black was added (Example 5), resulted in an aged tensile X elongation improvement of 15 to 65% over the sample where all of the carbon black was added first (Example 8), thereby demonstrating the criticality of the order of addition.

While certain representative embodiments and details have been shown for the purpose of illustrating the invention, it will be apparent to those skilled in this art that various changes and modifications may be made therein without departing from the spirit or scope of the invention.

I claim:

1. In a process of preparing an unvulcanized conjugated diene polymer containing a reinforcing agent, said polymer containing not more than 0.25 part by weight per 100 parts by weight of an anti-hardener and being capable of being vulcanized with a sulfur-type vulcanization system to form a vulcanizate, said vulcanizate having a tendency to harden, the improvement wherein an amide, in the amount of at least 0.25 part by weight per 100 parts by weight of polymer, is added to the polymer before all of the reinforcing agent has been added to the polymer with the proviso that the polymer contains less than 30 parts by weight of reinforcing agent per 100 parts by weight of polymer when the amide is added and wherein the amide has the following structural formula:

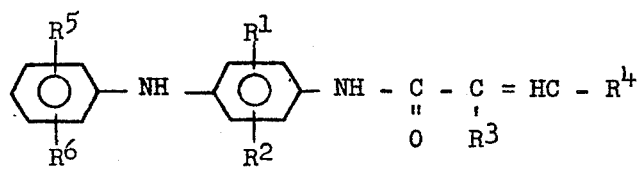

wherein $R^1$, $R^2$, $R^5$ and $R^6$ are selected from the group consisting of hydrogen and alkyl radicals having from 1 to 4 carbon atoms, wherein $R^5$ and $R^6$ can also be alkoxy radicals having 1 to 4 carbon atoms, and wherein $R^3$ is selected from the group consisting of hydrogen, alkyl radicals having from 1 to 4 carbon atoms, aryl radicals having from 6 to 12 carbon atoms, aralkyl radicals having from 7 to 13 carbon atoms, cycloalkyl radicals having from 5 to 12 carbon atoms carboxymethyl radicals and carbalkoxy methyl radicals and wherein $R^4$ is selected from the group consisting of hydrogen, alkyl radicals having from 1 to 4 carbon atoms, aryl radicals having from 6 to 12 carbon atoms, cycloalkyl radicals having from 5 to 12 carbon atoms, carboxy radicals and carbalkoxy radicals.

2. The vulcanizate prepared by vulcanizing the unvulcanized conjugated diene polymer of claim 1 with an efficient or semi-efficient sulfur-type vulcanization system.

3. The unvulcanized conjugated diene polymer prepared according to the process of claim 1.

4. The process of claim 1 wherein the reinforcing agent is carbon black.

5. The process of claim 4 wherein the conjugated diene is butadiene-1,3.

6. The process of claim 5 wherein the polymer is a copolymer containing at least 40 parts by weight of butadiene-1,3 per 100 parts by weight of polymer and as a comonomer a monomer selected from the group consisting of styrene and acrylonitrile.

7. The process according to claim 1 wherein the amide is N-(4-anilinophenyl)-methacrylamide.

8. The process according to claim 1 wherein the polymer contains less than 20 parts by weight of reinforcing agent per 100 parts by weight of polymer when the amide is added.

9. The process according to claim 1 wherein the polymer contains less than 10 parts by weight of reinforcing agent per 100 parts by weight of polymer when the amide is added.

10. The vulcanizate according to claim 2 wherein the vulcanization system contains 0 to 0.5 part by weight of free sulfur per 100 parts by weight of polymer.

* * * * *